US 8,700,850 B1

(12) United States Patent
Lalouette

(10) Patent No.: US 8,700,850 B1
(45) Date of Patent: Apr. 15, 2014

(54) DATA STORAGE DEVICE EVALUATING A SATA CONNECTOR TO DETECT A NON-SATA HOST

(75) Inventor: Marc J. Lalouette, Laguna Beach, CA (US)

(73) Assignee: Western Digital Technologies, Inc., Irvine, CA (US)

(*) Notice: Subject to any disclaimer, the term of this patent is extended or adjusted under 35 U.S.C. 154(b) by 474 days.

(21) Appl. No.: 13/168,903

(22) Filed: Jun. 24, 2011

(51) Int. Cl.
G06F 3/06 (2006.01)
H04L 29/06 (2006.01)

(52) U.S. Cl.
CPC ........ G06F 3/0679 (2013.01); H04L 29/06163 (2013.01)
USPC ...... 711/115; 711/E12.001; 710/11; 710/305; 710/316

(58) Field of Classification Search
None
See application file for complete search history.

(56) References Cited

U.S. PATENT DOCUMENTS

| | | | |
|---|---|---|---|
| 4,972,368 A | 11/1990 | O'Brien et al. | |
| 5,875,293 A | 2/1999 | Bell et al. | |
| 6,065,096 A | 5/2000 | Day et al. | |
| 6,270,415 B1 | 8/2001 | Church et al. | |
| 6,687,775 B1 | 2/2004 | Bassett | |
| 6,761,580 B2 | 7/2004 | Chang | |
| 6,845,420 B2 | 1/2005 | Resnick | |
| 6,886,057 B2 | 4/2005 | Brewer et al. | |
| 6,890,188 B1 | 5/2005 | Le | |
| 7,171,502 B2 | 1/2007 | Jeon et al. | |
| 7,219,846 B2 | 5/2007 | Kuo et al. | |
| 7,262,961 B2 | 8/2007 | Motoe et al. | |
| 7,424,126 B2 | 9/2008 | Sicari et al. | |
| 7,632,139 B2 | 12/2009 | Chou et al. | |
| 7,685,337 B2 | 3/2010 | Merry, Jr. et al. | |
| 7,685,338 B2 | 3/2010 | Merry, Jr. et al. | |
| 7,761,647 B2 | 7/2010 | Yang | |
| 2002/0046366 A1 | 4/2002 | Ono | |
| 2003/0005188 A1 | 1/2003 | Tehrani et al. | |
| 2004/0083324 A1 | 4/2004 | Rabinovitz et al. | |
| 2004/0087213 A1 | 5/2004 | Kao | |
| 2005/0066203 A1 | 3/2005 | Handa et al. | |
| 2005/0172044 A1 | 8/2005 | Chien et al. | |
| 2005/0176303 A1 | 8/2005 | Wu | |
| 2005/0197017 A1 | 9/2005 | Chou et al. | |
| 2005/0235171 A1 | 10/2005 | Igari | |
| 2005/0268007 A1 | 12/2005 | Nakabayashi | |
| 2006/0174049 A1 | 8/2006 | Lin et al. | |
| 2007/0053170 A1 | 3/2007 | Yu | |
| 2007/0197100 A1 | 8/2007 | Tsao | |
| 2007/0260811 A1 | 11/2007 | Merry et al. | |
| 2008/0162755 A1 | 7/2008 | Minami | |
| 2008/0200072 A1 | 8/2008 | Cheong | |
| 2010/0223416 A1 | 9/2010 | Ibarra et al. | |

OTHER PUBLICATIONS

SATA-IO, "Serial ATA Revision 3.0 Specification", Jun. 2009, https://www.serialata.org/developers/purchase_spec.asp.
Vantec, "NexStar SATA 6Gbps to USB 3.0 Adapter", http://www.vantecusa.com/en/product/view_detail/471, Jun. 2011.
Unitek, "Unitek USB 3.0 SATA Adapter (Y-1034)",http://usb.brando.com/unitek-usb-3-0-to-sata-adapter-y-1034-_p01348c042d15.html, Jun. 2011.

Primary Examiner — Kevin Verbrugge

(57) ABSTRACT

A data storage device (DSD) is disclosed comprising a SATA connector and control circuitry comprising a communication module for communicating with a host. At least one pin of the SATA connector is evaluated to detect a host type. When the host type is SATA, the communication module is configured to operate according to a SATA protocol, and when the host type is non-SATA, the communication module is configured to operate according to a non-SATA protocol.

25 Claims, 4 Drawing Sheets

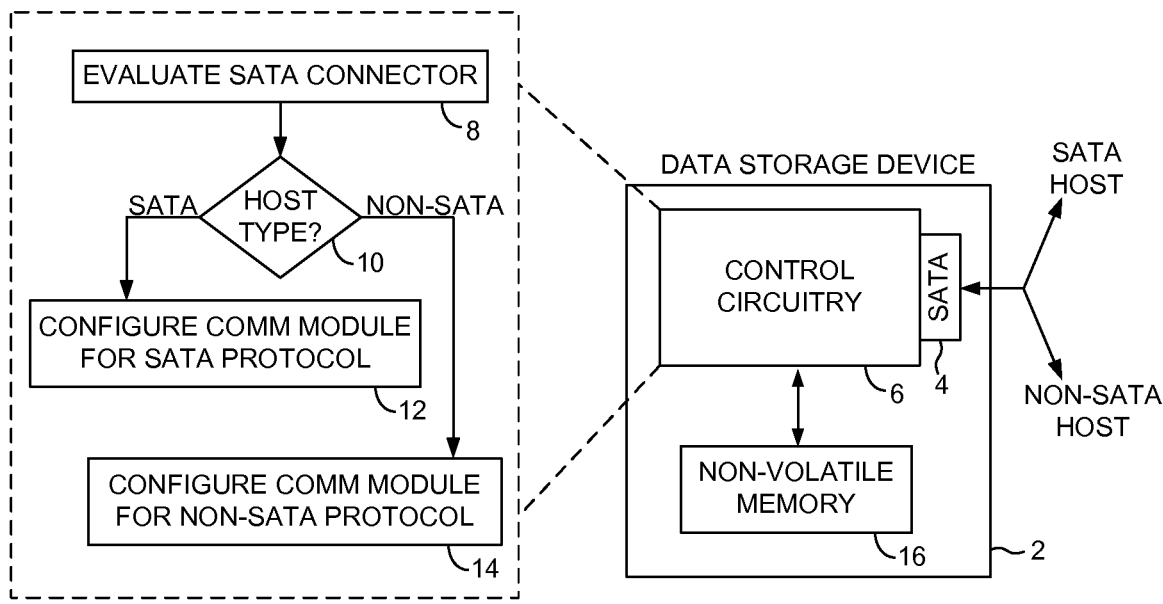
FIG. 1B
FIG. 1A
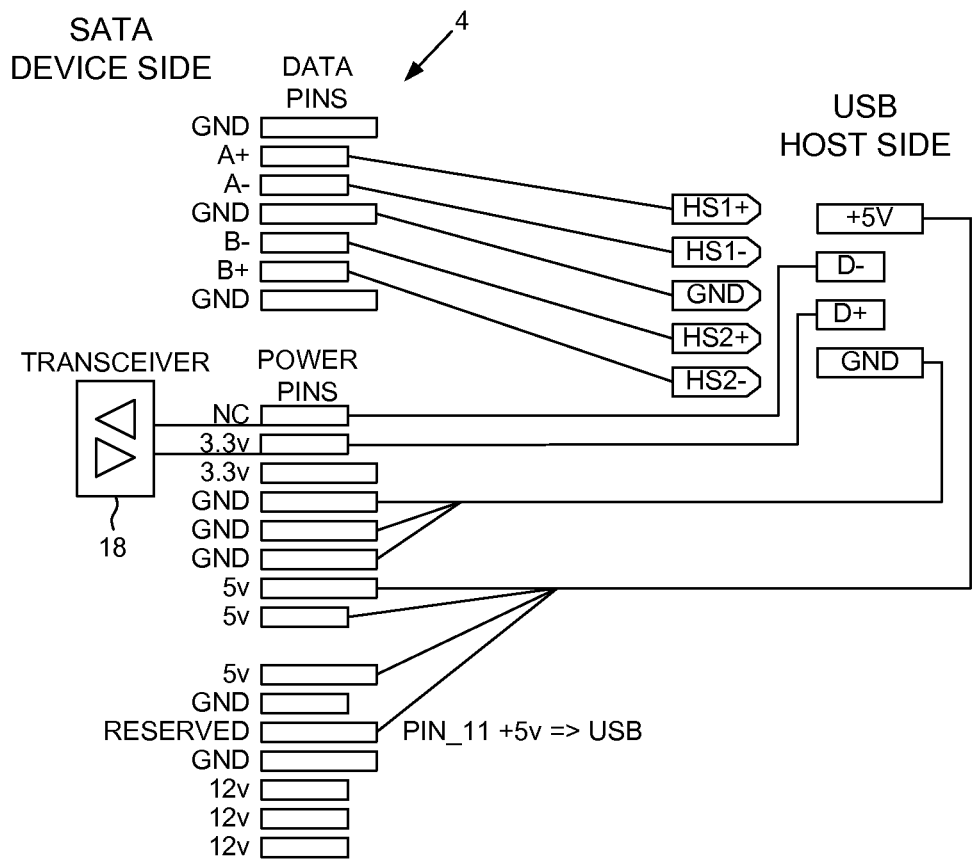
FIG. 2

US 8,700,850 B1

DATA STORAGE DEVICE EVALUATING A SATA CONNECTOR TO DETECT A NON-SATA HOST

BACKGROUND

Data storage devices (DSDs), such as disk drives and solid state drives, may interface with a host through a cable having a SATA connector at the device side. At the host side, the cable may comprise a similar SATA connector, or a non-SATA connector such as a USB connector and a bridge referred to as a dongle. The dongle comprises circuitry for implementing a SATA/USB protocol conversion that enables a USB host to communicate with the SATA device. However, using a dongle to implement the SATA/USB protocol conversion increases the cost of the cable.

BRIEF DESCRIPTION OF THE DRAWINGS

FIG. 1A shows a data storage device (DSD) comprising a SATA connector operable to connect to a SATA host or a non-SATA host.

FIG. 1B is a flow diagram according to an embodiment of the present invention wherein a pin of the SATA connector is evaluated to detect the host type, and then a communication module is configured accordingly.

FIG. 2 shows an embodiment of the present invention wherein a reserved power pin of the SATA connector is evaluated to detect a non-SATA host type such as a Universal Serial Bus (USB) host type.

DETAILED DESCRIPTION OF EMBODIMENTS OF THE INVENTION

Figure 3A:
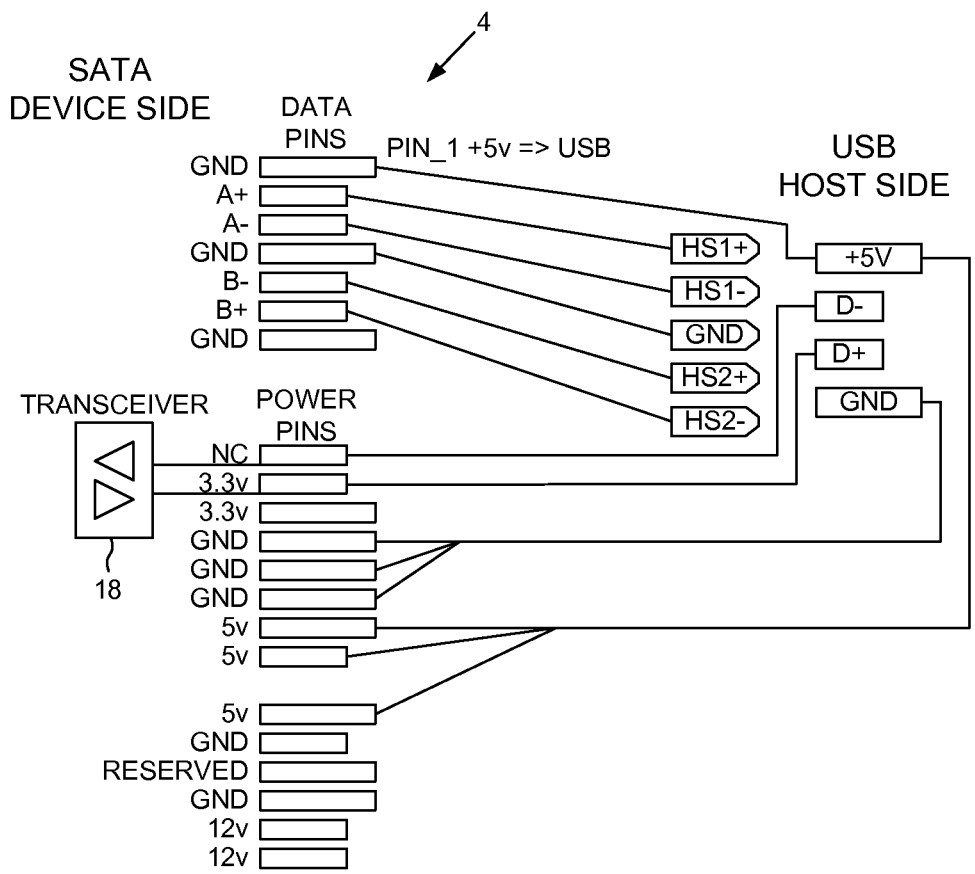
FIG. 3A shows an embodiment of the present invention wherein a ground data pin of the SATA connector is evaluated to detect a USB host type.

FIG. 1A shows a data storage device (DSD) 2 according to an embodiment of the present invention comprising a SATA connector 4 and control circuitry 6 comprising a communication module for communicating with a host. The control circuitry 6 is operable to execute the flow diagram of FIG. 1B, wherein at least one pin of the SATA connector is evaluated (step 8) to detect a host type (step 10). When the host type is SATA, the communication module is configured to operate according to a SATA protocol (step 12), and when the host type is non-SATA, the communication module is configured to operate according to a non-SATA protocol (step 14).

Any suitable DSD may be employed in the embodiments of the present invention, such as a disk drive or a solid state drive. In the embodiment of FIG. 1A, the DSD comprises a non-volatile memory 16 such as the disk of a disk drive or a non-volatile semiconductor memory (e.g., flash memory) of a solid state drive. Different product lines of a DSD may be developed by a manufacturer (such as different form factor disk drives), wherein certain product lines may operate according to a SATA protocol and other product lines may operate according to a non-SATA protocol. For example, large form factor disk drives may operate according to the SATA protocol, whereas small form factor disk drives may operate according to a USB protocol. This creates a burden during manufacturing and testing of the DSDs since it requires test stations and interface cables that are compatible with the protocol of each DSD. For example, testing a SATA DSD may require a SATA cable to connect to a test station, and testing a USB DSD may require a USB cable to connect to a test station. A cable including a dongle having circuitry for implementing a SATA/USB protocol conversion may enable a USB test station to communicate with a SATA DSD so that only one type of USB test station is required. However, using a dongle to implement the SATA/USB protocol conversion increases the cost of the cable.

In an alternative technique for testing DSDs, a manufacturer may initially mount a printed circuit board (PCB) to the DSD having a SATA connector for connecting to a SATA test station, thereby enabling all of the DSDs to be tested using the SATA connector. Prior to shipping a DSD to a customer requiring a USB protocol, the manufacturer may swap the PCB having the SATA connector with a PCB having a USB connector. However, swapping the PCB in order to change the connector type increases the manufacturing time, as well as the cost involved with manufacturing multiple types of PCBs having different types of connectors.

In the embodiments of the present invention, a DSD 2 comprises a SATA connector 4 and control circuitry 6 for evaluating at least one pin of the SATA connector to detect a host type. The control circuitry 6 then configures a communication module to communicate with the host using a SATA or non-SATA protocol as needed. This enables the DSD 2 to be connected to a non-SATA host using a suitable cable without needing an intervening dongle integrated with the cable, and without needing to swap out the PCB in order to support a non-SATA connector. An example of this embodiment is illustrated in FIG. 2 which shows the pins of a SATA connector at the device side (DSD side) wired through a suitable cable directly to the pins of a USB connector at the host side. The SATA connector comprises a plurality of data pins (1-7) and a plurality of power pins (1-15) as defined by the SATA specification. In the embodiment of FIG. 2, the control circuitry 6 evaluates pin 11 of the SATA power pins (which is a reserved pin) to detect the host type. For example, when connecting to a USB host, pin 11 of the SATA power pins may be connected to a five volt pin of the USB connector at the host side as shown in FIG. 2. When the DSD is booted (e.g., powered on or reset), the control circuitry 6 evaluates pin 11 of the SATA power pins and detects a USB host type if pin 11 is pulled up to five volts.

FIG. 2 also illustrates an embodiment wherein both a standard USB host is supported as well as a high speed USB host. The data pins of the standard USB connector (D+ and D−) are connected to pins 1 and 2 of the SATA power pins, and the data pins of the high speed USB connector (HS1+/HS1− and HS2+/HS2−) are connected to pins ⅔ and ⅚ of the SATA data pins. The SATA protocol defines pin 1 of the SATA power pins as a no-connect (NC), and pin 2 of the SATA power pins as 3.3v supply voltage. A transceiver (not shown) is connected to SATA data pins ⅔ and to SATA data pins ⅚ which is capable of transceiving the data signals from either a SATA host or a USB host. A transceiver 18 is also connected to SATA power pins ½ capable of transceiving the data signals of the standard USB connector. When a SATA host is connected to the SATA connector 4, the transceiver 18 is not used, and the interface circuitry of the transceiver 18 is designed to withstand a 3.3v supply voltage that may be supplied by the SATA host connector.

Figure 3B:
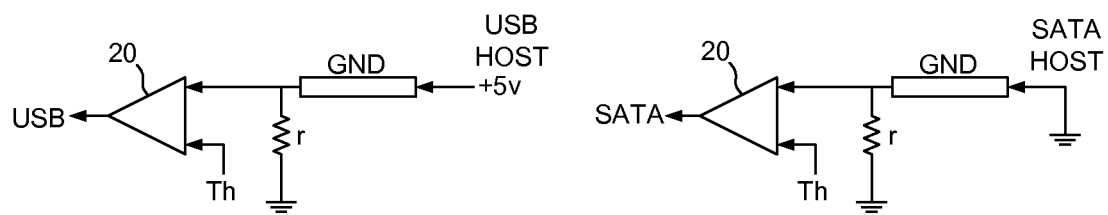
FIGS. 3B and 3C show circuitry according to an embodiment of the present invention wherein the ground data pin of the SATA connector is compared to a threshold using a pull-down resistor to detect the host type.
Figure 3C:
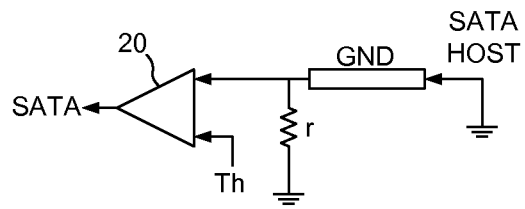

FIG. 3A shows an alternative embodiment of the present invention wherein the control circuitry 6 evaluates pin 1 of the SATA data pins to detect the host type. In the embodiment of FIG. 3A, the control circuitry 6 detects a USB host type if pin 1 of the SATA data pins is pulled up to five volts (i.e., pin 1 of the SATA data pins is connected to a 5v supply line of the USB connector as shown in FIG. 3A). Otherwise the control circuitry 6 detects a SATA host type if pin 1 is grounded by a SATA host connector. FIG. 3B shows example control circuitry 6 for detecting the host type, wherein a ground pin of the SATA connector (e.g., pin 1 of the data pins) is connected to a first input of a comparator 20 through a pull-down resistor r. The ground pin of the SATA connector is compared to a suitable threshold Th (e.g., by voltage dividing one of the 5v supply pins of the SATA power pins, such as pin 7 of the SATA power pins shown in FIG. 3A). If the ground pin voltage is greater than the threshold Th, the control circuitry 6 detects a USB host type as shown in FIG. 3B, otherwise the control circuitry 6 detects a SATA host type. That is, when the ground pin is connected to the ground pin of a SATA host connector, the ground pin is grounded through the pull-down resistor r as shown in FIG. 3C.

Figure 4A:
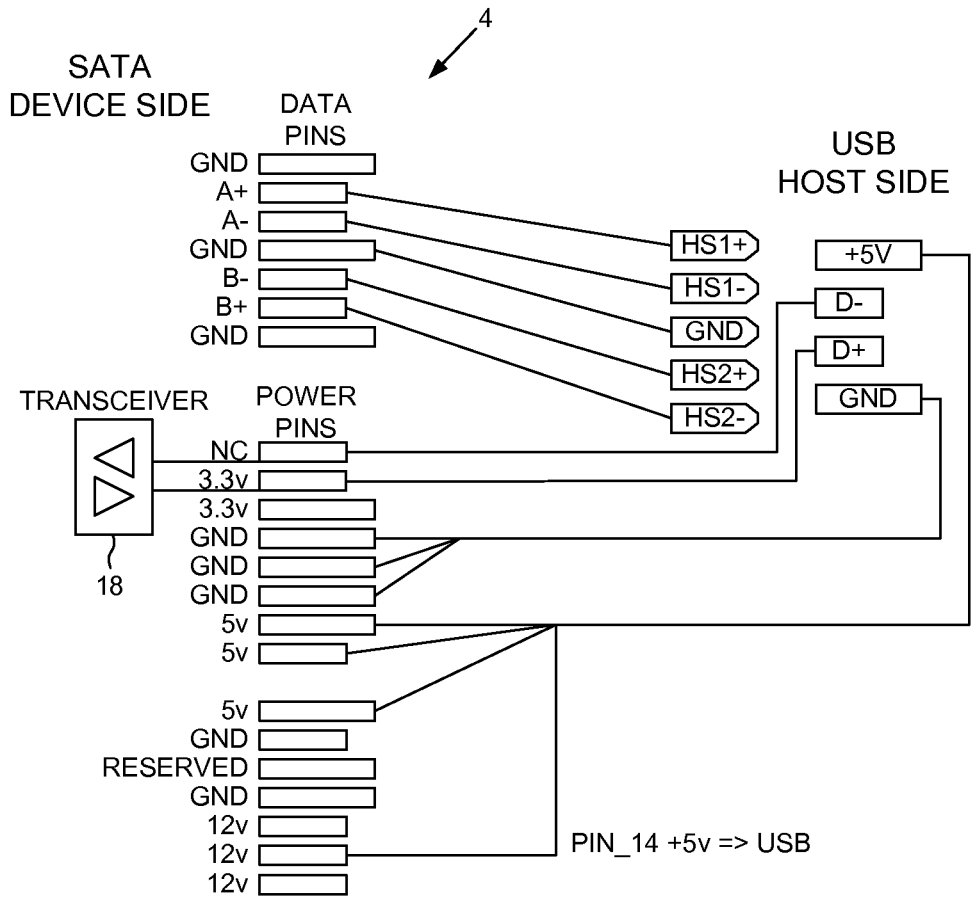
FIG. 4A shows an embodiment of the present invention wherein a 12v power pin of the SATA connector is evaluated to detect a USB host type.
Figures 4B, 4C:
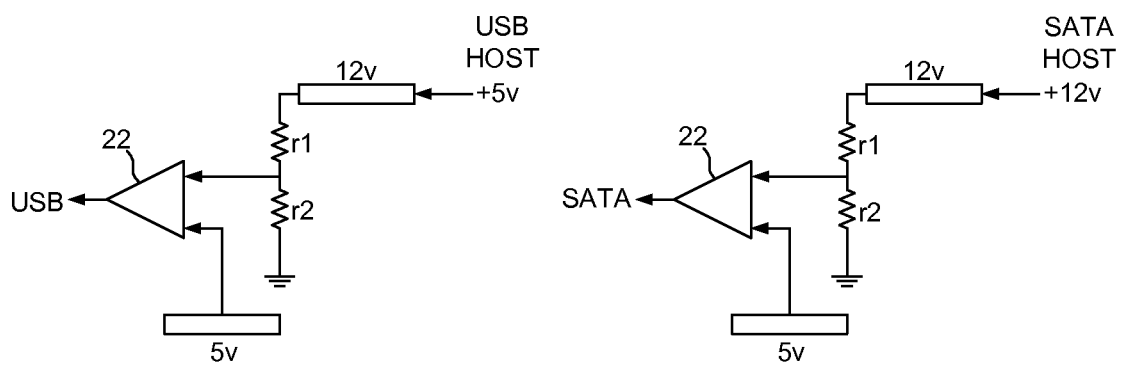
FIGS. 4B and 4C show circuitry according to an embodiment of the present invention for detecting the host type by evaluating a 12v power pin of the SATA connector.

FIG. 4A shows another embodiment of the present invention wherein the control circuitry evaluates one of the 12v power pins (e.g., pin 14) of the SATA power pins to detect the host type. FIG. 4B shows example control circuitry 6 for detecting the host type, wherein the 12v supply pin is voltage divided (e.g., in half) by resistors r1 and r2. The voltage across resistor r2 is compared 22 to a 5v power pin of the SATA power pins (e.g., pin 7). A USB host is detected if the voltage across resistor r2 is less than five volts since the 12v power pin is connected to a 5v supply line of a USB host connector as shown in FIG. 4B. Otherwise a SATA host is detected if the voltage across resistor r2 is greater than five volts since the 12v power pin is connected to a 12v supply line of a SATA host connector as shown in FIG. 4C.

Any suitable control circuitry may be employed in the embodiments of the present invention, such as any suitable integrated circuit or circuits (e.g., an application specific integrated circuit (ASIC)). In one embodiment, the control circuitry comprises a microprocessor operable to execute the steps of a control program stored on any suitable computer readable medium (e.g., a disk or semiconductor memory). The communication module for implementing the SATA and non-SATA protocols may be implemented using an ASIC, or using a control program, or using a combination of an ASIC and a control program. In addition, the control circuitry may comprise any suitable circuitry for processing signals in the analog domain and/or in the digital domain (e.g., suitable analog and/or digital circuitry for processing the signals of the SATA connector).

Figure 5:
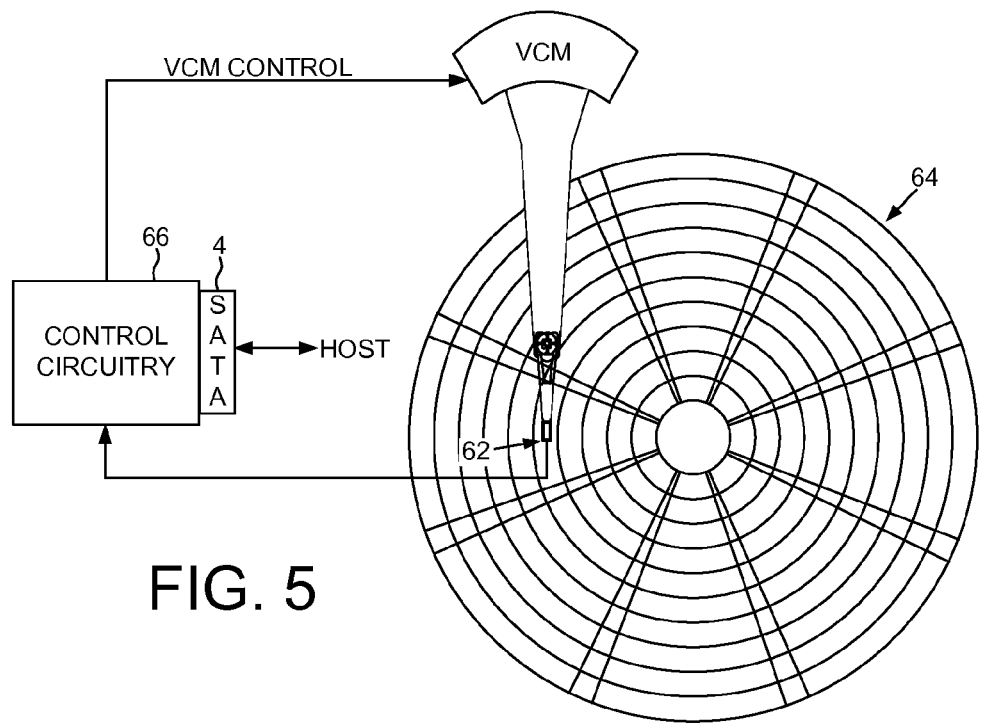
FIG. 5 shows an embodiment of the present invention wherein the DSD comprises a disk drive.

The embodiments of the present invention may also be implemented by the control circuitry of any suitable data storage device 2. FIG. 5 shows a data storage device in the form of a disk drive comprising a head 62 actuated over a disk 64 having a plurality of tracks. The disk drive further comprises control circuitry 66 for receiving access commands from a host (write/read commands) and for generating a control signal applied to a voice coil motor (VCM) to rotate an actuator arm about a pivot in order to position the head 62 radially over the disk 64 to access a target track. Each track is divided into a number of physical data sectors, wherein each physical data sector comprises a plurality of logical data sectors.

Figure 6:
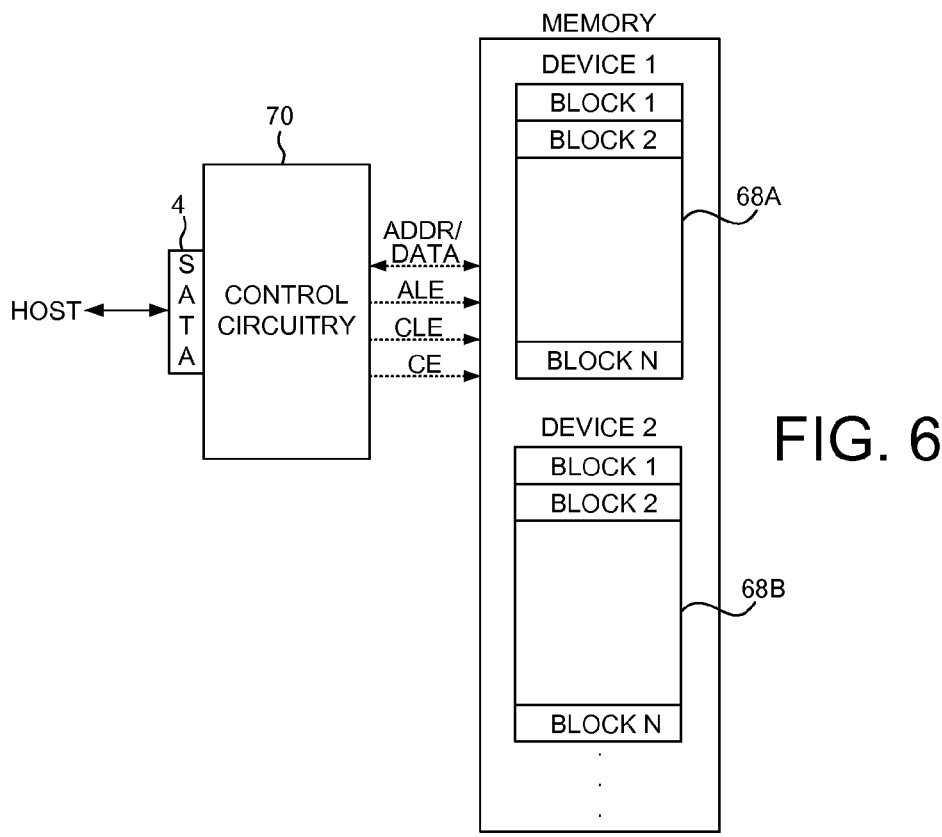
FIG. 6 shows an embodiment of the present invention wherein the DSD comprises a solid state drive.

FIG. 6 shows a data storage device in the form of solid state drive comprising a plurality of non-volatile semiconductor memories 68A, 68B, etc., such as flash memories, and control circuitry 70 for accessing the non-volatile semiconductor memories. In one embodiment, the physical data sector of the solid state drive corresponds to a page of memory in a memory array, wherein each page stores a plurality of logical data sectors. A hybrid data storage device may also be employed comprising components of a disk drive shown in FIG. 5 combined with the non-volatile semiconductor memories shown in FIG. 6.

What is claimed is:

1. A data storage device (DSD) comprising a SATA connector and control circuitry comprising a communication module for communicating with a host, wherein the control circuitry is operable to:
   evaluate at least one pin of the SATA connector to detect a host type;
   when the host type is SATA, configure the communication module to operate according to a SATA protocol; and
   when the host type is non-SATA, configure the communication module to operate according to a non-SATA protocol.

2. The data storage device as recited in claim 1, wherein the non-SATA host type comprises a Universal Serial Bus (USB) host type.

3. The data storage device as recited in claim 1, wherein:
   the SATA connector comprises a first plurality of data pins and a second plurality of power pins;
   the second plurality of power pins comprises at least one five volt pin, at least one twelve volt pin, and at least one reserved pin; and
   the control circuitry is operable to evaluate at least one of the power pins to detect the host type.

4. The data storage device as recited in claim 3, wherein the control circuitry is operable to evaluate the at least one reserved pin of the power pins to detect the host type.

5. The data storage device as recited in claim 3, wherein the control circuitry is operable to evaluate the at least one twelve volt pin of the power pins to detect the host type.

6. The data storage device as recited in claim 3, wherein the control circuitry is operable to detect the host type is non-SATA when at least one of the power pins is driven with a voltage.

7. The data storage device as recited in claim 6, wherein the voltage comprises five volts.

8. The data storage device as recited in claim 7, wherein:
   the non-SATA host type comprises a Universal Serial Bus (USB) host type; and
   the five volts is generated by a supply pin of a USB connector.

9. The data storage device as recited in claim 1, wherein:
   the SATA connector comprises a first plurality of data pins and a second plurality of power pins;
   the first plurality of data pins comprises at least one ground pin; and
   the control circuitry is operable to evaluate the at least one ground pin of the first plurality of data pins to detect the host type.

10. The data storage device as recited in claim 1, wherein:
    the non-SATA host type comprises a Universal Serial Bus (USB) host type;
    the SATA connector comprises a first plurality of data pins and a second plurality of power pins; and at least one of the data pins of the SATA connector is connected to a data pin of a USB connector connected to the host.

11. The data storage device as recited in claim 1, wherein:
the non-SATA host type comprises a Universal Serial Bus (USB) host type;
the SATA connector comprises a first plurality of data pins and a second plurality of power pins; and
at least one of the power pins of the SATA connector is connected to a data pin of a USB connector connected to the host.

12. The data storage device as recited in claim 11, further comprising a transceiver connected to the at least one of the power pins of the SATA connector.

13. The data storage device as recited in claim 1, wherein:
the non-SATA host type comprises a Universal Serial Bus (USB) host type;
the SATA connector comprises a first plurality of data pins and a second plurality of power pins; and
at least one of the power pins of the SATA connector is connected to a power pin of a USB connector connected to the host.

14. A method of operating a data storage device comprising a SATA connector and control circuitry comprising a communication module for communicating with a host, the method comprising:
evaluating at least one pin of the SATA connector to detect a host type;
when the host type is SATA, configuring the communication module to operate according to a SATA protocol; and
when the host type is non-SATA, configuring the communication module to operate according to a non-SATA protocol.

15. The method as recited in claim 14, wherein the non-SATA host type comprises a Universal Serial Bus (USB) host type.

16. The method as recited in claim 14, wherein:
the SATA connector comprises a first plurality of data pins and a second plurality of power pins;
the second plurality of power pins comprises at least one five volt pin, at least one twelve volt pin, and at least one reserved pin; and
the method further comprises evaluating at least one of the power pins to detect the host type.

17. The method as recited in claim 16, further comprising evaluating the at least one reserved pin of the power pins to detect the host type.

18. The method as recited in claim 16, further comprising evaluating the at least one twelve volt pin of the power pins to detect the host type.

19. The method as recited in claim 16, further comprising detecting the host type is non-SATA when at least one of the power pins is driven with a voltage.

20. The method as recited in claim 19, wherein the voltage comprises five volts.

21. The method as recited in claim 20, wherein:
the non-SATA host type comprises a Universal Serial Bus (USB) host type; and
the five volts is generated by a supply pin of a USB connector.

22. The method as recited in claim 14, wherein:
the SATA connector comprises a first plurality of data pins and a second plurality of power pins;
the first plurality of data pins comprises at least one ground pin; and
the method further comprises evaluating the at least one ground pin of the first plurality of data pins to detect the host type.

23. The method as recited in claim 14, wherein:
the non-SATA host type comprises a Universal Serial Bus (USB) host type;
the SATA connector comprises a first plurality of data pins and a second plurality of power pins; and
at least one of the data pins of the SATA connector is connected to a data pin of a USB connector connected to the host.

24. The method as recited in claim 14, wherein:
the non-SATA host type comprises a Universal Serial Bus (USB) host type;
the SATA connector comprises a first plurality of data pins and a second plurality of power pins; and
at least one of the power pins of the SATA connector is connected to a data pin of a USB connector connected to the host.

25. The method as recited in claim 14, wherein:
the non-SATA host type comprises a Universal Serial Bus (USB) host type;
the SATA connector comprises a first plurality of data pins and a second plurality of power pins; and
at least one of the power pins of the SATA connector is connected to a power pin of a USB connector connected to the host.

* * * * *